United States Patent [19]
Rossie

[11] Patent Number: 4,652,782
[45] Date of Patent: Mar. 24, 1987

[54] FLANGED STATOR ASSEMBLY FOR DYNAMOELECTRIC MACHINE

[75] Inventor: Joseph F. Rossie, Rockford, Ill.

[73] Assignee: Sundstrand Corporation, Rockford, Ill.

[21] Appl. No.: 846,294

[22] Filed: Mar. 31, 1986

[51] Int. Cl.[4] .............................................. H02K 1/18
[52] U.S. Cl. ..................................... 310/217; 29/596; 310/259
[58] Field of Search ................. 310/216, 217, 218, 89, 310/42, 254, 259; 29/596

[56] References Cited

U.S. PATENT DOCUMENTS

| | | | |
|---|---|---|---|
| 1,446,898 | 2/1923 | Gysel . | |
| 2,860,289 | 11/1958 | Verardo | 310/216 |
| 2,922,902 | 1/1960 | Hargreaves | 310/217 |
| 3,299,304 | 1/1967 | Hull | 310/217 |
| 3,493,794 | 2/1970 | Hickle | 310/259 |
| 3,538,362 | 11/1970 | Cheetham et al. | 310/68 |
| 3,588,561 | 6/1971 | Hoffmeyer | 310/216 |
| 3,606,674 | 9/1971 | Givan | 29/596 |
| 3,671,787 | 6/1972 | Herron | 310/154 |
| 3,783,318 | 1/1974 | Widstrand | 310/216 |
| 3,979,822 | 9/1976 | Halm | 29/596 |
| 4,227,101 | 10/1980 | Malakian et al. | 310/89 |
| 4,514,655 | 4/1985 | Hosoya | 310/216 |

FOREIGN PATENT DOCUMENTS 1557192  2/1968  France ................................ 310/216

Primary Examiner—Patrick R. Salce
Assistant Examiner—D. L. Rebsch
Attorney, Agent, or Firm—Wood, Dalton, Phillips Mason and Rowe

[57] ABSTRACT

In a dynamoelectric machine, a stator assembly is mounted directly to a mounting face of a housing surrounding a rotor projecting from the housing beyond the mounting face in a cantilevered orientation. The stator assembly includes a plurality of laminations bonded together in a stacked array for circumferentially surrounding the rotor. A given number of the laminations at one end of the stator assembly are radially enlarged to define a circumferential mounting flange. The flange is secured directly to the mounting face of the housing and adjustable relative thereto.

6 Claims, 3 Drawing Figures

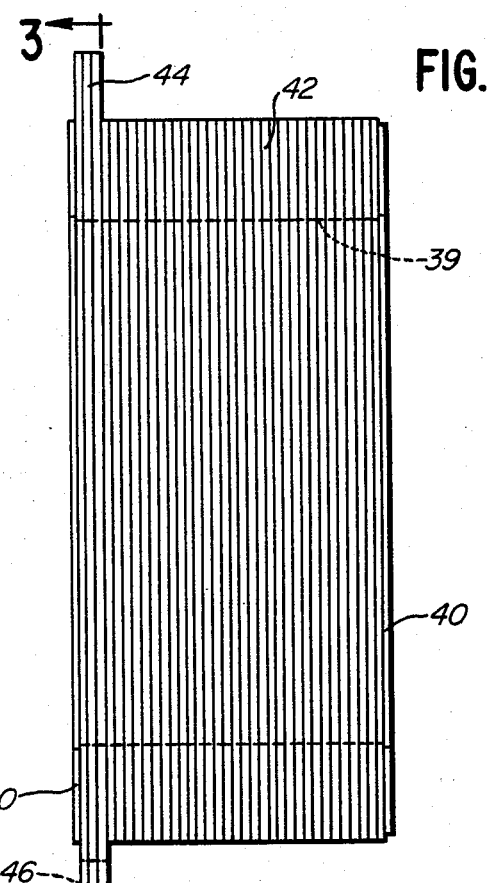
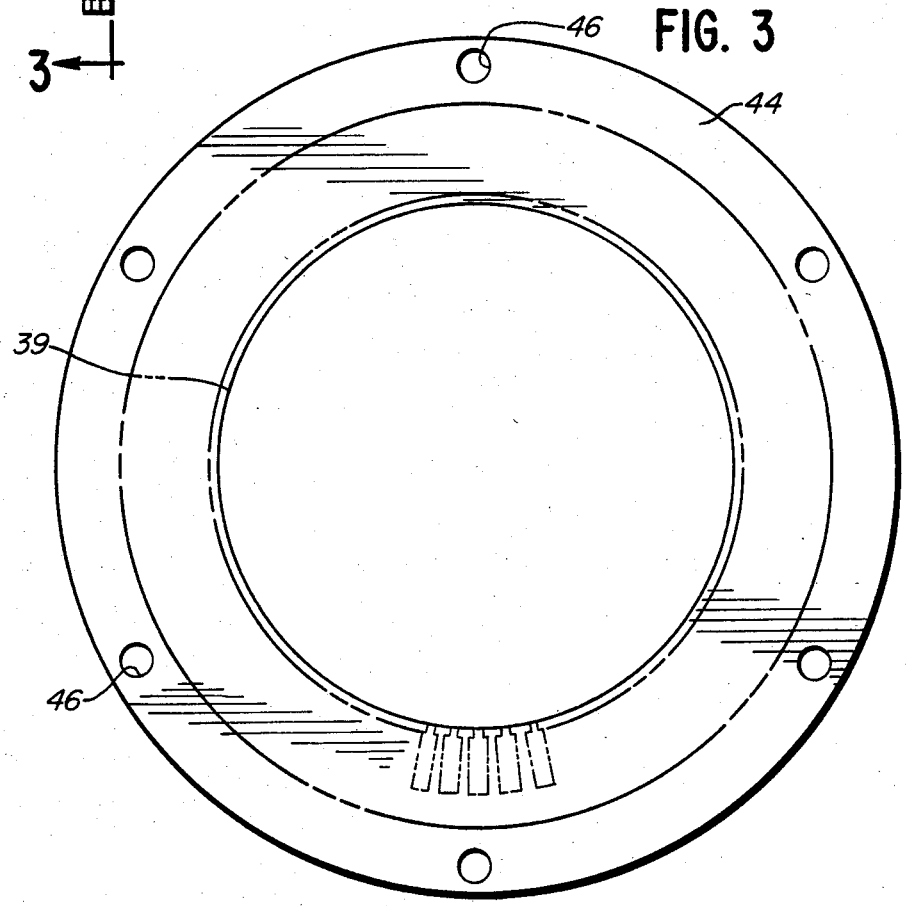

ABSTRACT

FLANGED STATOR ASSEMBLY FOR DYNAMOELECTRIC MACHINE

FIELD OF THE INVENTION

This invention generally relates to dynamoelectric machines and, particularly, to a stator assembly for a dynamoelectric machine.

BACKGROUND OF THE INVENTION AND DESCRIPTION OF THE PRIOR ART

Certain types of electric motors are manufactured or assembled by forming a stator of a series of stator plates stacked together to form a laminated body. In some instances, the laminations are permanently bonded to one another to form a rigid, solid body or core. In other instances, the laminations are assembled in a loose array for subsequent repositioning. In either instance, the motor field windings then are installed, usually in axially extending slots in the wall of a bore through the stator. This stator then is attached to the frame of the motor with the bore receiving a rotor attached to a shaft journalled in the frame or associated structure. Preferably, the stator bore walls and the rotor are concentric, to provide a uniform air gap between the two parts; otherwise the motor will be inefficient and have unacceptable operating characteristics.

In some applications, the motor stator assembly is mounted in a separate housing which is provided with pins or other means to transmit the reaction torque to the housing. The housing and stator assembly then is mounted to a support or directly to an additional housing with which the motor is to be used. For instance, the motor may be used for a driving hermetically sealed refrigerator compressor.

Such assembly techniques are too complex, costly and heavy for use with certain applications.

For instance, in the aircraft or similar field, complexity, weight and cost are extremely important considerations. An example of such a use is in stationary vane compressor drive motors used in the radar domes of aircraft where heat is generated and cooling is required. A refrigerant compressor conventionally is employed in such applications. However, the size and compact surroundings practically prohibit the use of conventional motors having separate housings within which the rotor and stator are contained. Complex mechanisms for grounding the reaction torque resulting from the pulsating torque load cannot be used in such confined areas.

This invention is directed to solving the above problems by providing a unique mount for a stator assembly in a cantilevered-type dynamoelectric machine or motor.

SUMMARY OF THE INVENTION

An object, therefore, of the invention is to provide a new and improved dynamoelectric machine with a unique assembly for mounting the motor stator.

Another object of the invention is to provide a method of manufacturing a dynamoelectric machine with the stator assembly of the invention.

In the exemplary embodiment of the invention, a housing is provided and defines a mounting face. A rotor projects from the housing beyond the mounting face in a cantilevered orientation. The stator assembly is mounted directly to the mounting face of the housing about the rotor.

Specifically, the stator assembly includes a plurality of laminations bonded together in a stacked array for circumferentially surrounding the rotor. A given number of the laminations at one end of the stator assembly are radially enlarged to define a circumferential mounting flange. Securing means, such as bolts, pass through the mounting flange at angularly spaced intervals to mount the stator assembly to the face of the housing about the rotor in a cantilevered orientation. Therefore, no extraneous housing means for the stator assembly are required. The mounting means, i.e. the enlarged laminations, provide a means for mounting the stator assembly without other extraneous mounting mechanisms. In essence, the complexity, weight and cost of prior motors of the character described are eliminated or greatly reduced by the invention.

Furthermore, the stator air gap can be easily adjusted to compensate for the eccentric rotation of the motor rotor before the stator is secured in place by fixing the enlarged flange at the one end of the motor. Specifically, enlarged apertures are provided in the stator flange for receiving the securing bolts.

The invention contemplates a method of manufacturing a dynamoelectric machine which includes housing means and rotor means projecting from the housing means in a cantilevered orientation. The method includes forming the stator assembly by bonding together a plurality of laminations in a stacked array, with the given number of laminations at one end of the stator assembly being enlarged to define the mounting flange means. The flange means then is secured to the housing to position the stator assembly about the rotor means. The stator assembly then is adjusted and fixed in position relative to the motor rotor.

Other objects, features and advantages of the invention will be apparent from the following detailed description taken in connection with the accompanying drawings.

DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 2 is an axial section through the stator assembly itself; and

FIG. 3 is a section taken generally along line 3—3 of FIG. 2.

DETAILED DESCRIPTION OF THE PREFERRED EMBODIMENT

Figure 1:
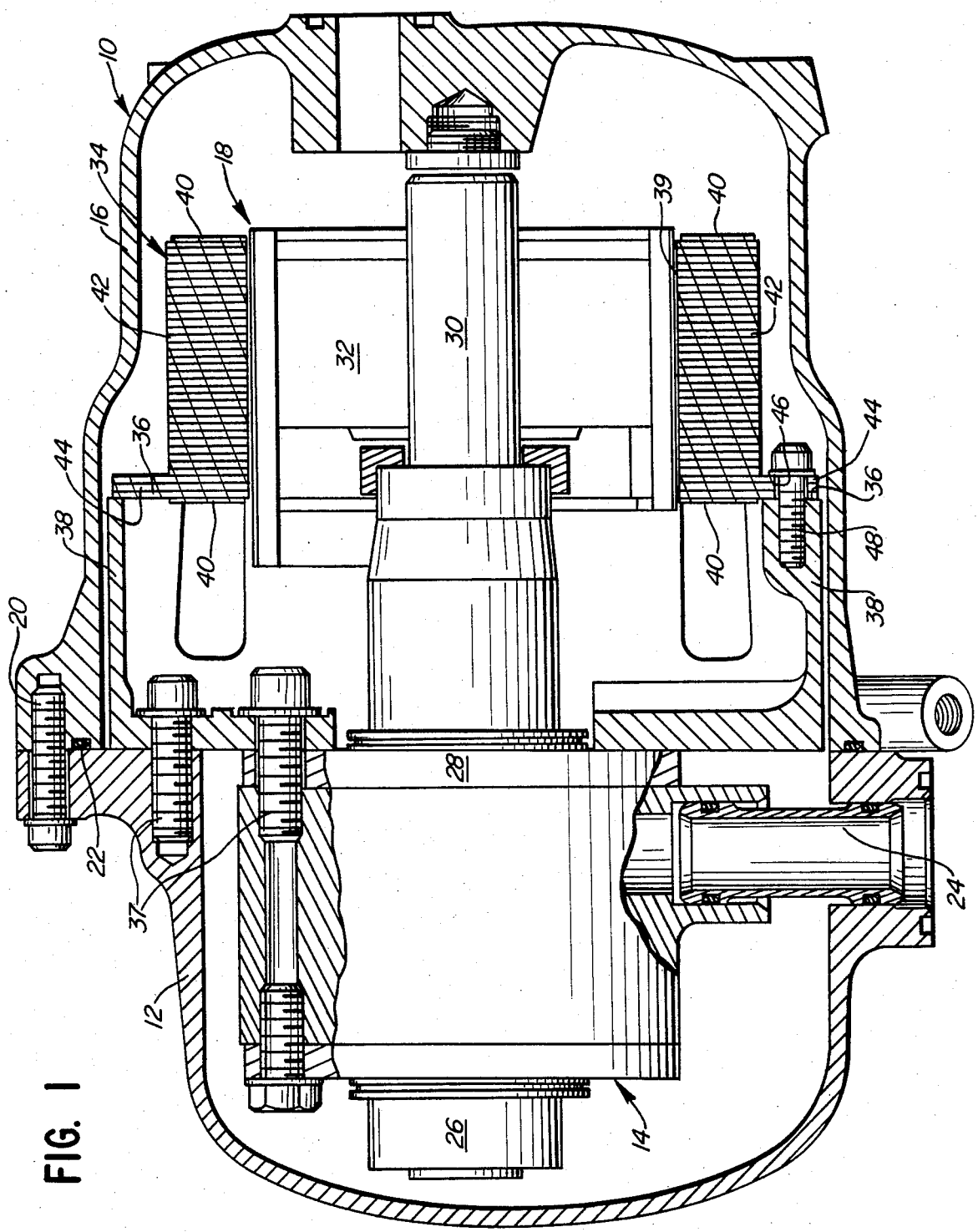
FIG. 1 is an axial section through a stationary vane compressor and drive motor, incorporating the stator assembly of the invention.

Referring to the drawings in greater detail, and first to FIG. 1, a stationary vane compressor and drive motor assembly is illustrated and generally designated 10. The assembly includes an outer housing or "can" having a first portion 12 housing a refrigerant compressor, generally designated 14, and a second portion 16 housing a motor, generally designated 18, including the stator assembly described hereinafter. First and second can portions 12 and 16, respectively, are secured together by circumferentially spaced bolts 20 and hermetically sealed by seal means 22.

An inlet 24 extends through can portion 12 to compressor 14. Bearings 26 and 28 are provided on opposite sides of compressor 14, and a motor drive shaft 30 extends axially through the assembly between compressor 14 and motor 18. A rotor 32 is fixed to shaft 30. A stator assembly, generally designated 34, surrounds rotor 32. As will be described in greater detail hereinafter, the stator assembly is fixed to a mounting face 36 of an interior housing means 38 for circumferentially surrounding rotor 32. Housing means 38 is secured to can portion 12 by interior bolts 37. As is conventional, motor field windings are installed in axially extending slots (not shown) in the wall of a bore 39 of stator assembly 34. In conventional operation, pulsating torque load results in rotation of rotor 32 to drive compressor 14 through drive shaft 30.

It can be seen that refrigerant compressor and drive motor assembly 10 is quite compact in construction, due in part to the mounting of rotor 32 and stator 34 in cantilevered fashion projecting outwardly from mounting face 36 of interior housing 38. It can be seen that no separate stator housing is required.

Referring to FIGS. 2 and 3, in conjunction with FIG. 1, stator assembly 34 generally comprises a core assembly of the laminated type. The core assembly includes an insulator lamination 40 at both ends. The stator core assembly includes a plurality of core laminations 42 which have dimensions set by the required electromagnetic performance of the motor. The core assembly further includes a given number of laminations 44 at the extreme inner end thereof which are enlarged in diameter to define a circumferential mounting flange.

The total number of core laminations 42 and flange laminations 44 provide the total stator magnetic circuit iron. The number of flange laminations 44 will depend on the desired thickness of the mounting flange. For instance, in one example, thirteen flange laminations 44, each of 0.014 inch thick, will give a 0.182 inch thick mounting flange. The increased diameter of flange laminations 44 may be on the order of 3/16 inch.

Means are provided for securing the flange means defined by flange laminations 44 to the mounting face 36 of housing 38 to mount stator assembly 34 in a cantilevered fashion surrounding rotor 32. More particularly, a plurality of holes or apertures 46 are provided through flange laminations 44 angularly spaced about the stator assembly. Bolts 48 (FIG. 1) are provided for positioning through apertures 46 and threadingly securing the stator assembly to housing 38. In order to provide for adjustment of the position of stator assembly 34 relative to rotor 32 to compensate for the eccentric rotation of the rotor, apertures 46 are enlarged relative to the diameter of bolts 48 to provide for radial adjustment of the stator relative to the fixed rotor before securely clamping the stator assembly in position about the rotor. This is important to provide a uniform air gap between the two parts. Otherwise, the motor will be inefficient and have unacceptable operating characteristics.

The invention contemplates a method of manufacturing the dynamoelectric machine for use in the compressor and drive motor assembly 10 described above. Specifically, the method contemplates forming stator assembly 34 by bonding together core laminations 42, flange laminations 44 and insulator lamination 40 in the stacked array illustrated and described above. This bonding technique could be performed by applying an epoxy compound to the laminations and then dried. The laminations then would be stacked, such as placing the laminations in a fixture tightened to a specific torque value that is calculated to result in a compression force based upon the contact area between adjacent laminations. The entire assembly then is placed in an oven and baked at a temperature high enough to melt the epoxy coating on the laminations. The epoxy cures or resolidifies upon cooling and thereby forms a bond between the lamination surfaces. After bonding the laminations of the stator assembly, it can be seen that the mounting flange means provided by flange laminations 44 actually comprises an integral part of the stator assembly, eliminating all extraneous mounting fixtures or mechanisms.

In addition, it should be noted that bonded stator stack assemblies of the prior art conventionally have the outside diameter machined to fit complementary housing structures, and a timing/torque restricting hole put into its outside diameter or end face. This has been necessary to properly mount the stator in a housing. With the stator assembly of this invention, such machining is not necessary since the stator assembly is not mounted in a housing and the timing torque restriction function is accomplished by the enlarged apertures formed in the mounting flange itself of the stator assembly.

Of course, the coils or windings which are surrounded by insulating material are assembled to the stator assembly prior to mounting the assembly to housing 38. The completed stator assembly with the windings installed simply is slipped over motor rotor 32 and fastened to housing 38 by means of flange laminations 44 and bolts 48. The stator air gap finally is adjusted to compensate for the eccentric rotation of the motor rotor before the flange laminations are finally fixed in place.

It can be seen that the dynamoelectric machine of this invention, particularly the unique means and method for mounting the stator assembly, provides an extremely simple, lightweight and inexpensive mount not heretofore available. The invention is readily applicable for use in confined areas, such as in aircraft applications, as for use in a refrigerant compressor in a radar dome of an airplane.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. In a dynamoelectric machine, the combination comprising:
   housing means;
   a stator assembly including a plurality of laminations bonded together in a stacked array, a given number of the laminations at one end of the stator assembly being enlarged to define mounting flange means;
   means for securing the flange means to the housing to mount the stator assembly in a cantilevered orientation relative to the housing means; and
   means associated with said flange means for adjusting the position of the stator assembly relative to the housing.

2. The combination of claim 1, including rotor means projecting from a face of the housing means, and said securing means mounting the flange means of the stator assembly to said face.

3. The combination of claim 1 wherein said securing means comprises bolt means and enlarged aperture means through the flange for receiving the bolt means.

4. The combination of claim 1 wherein said adjusting means comprises bolt means passing through enlarged aperture means in the flange means of the stator assembly.

5. In a dynamoelectric machine, the combination comprising:

housing means defining a mounting face;

a rotor projecting from the housing beyond the mounting face of the housing means in a cantilevered orientation;

a stator assembly including a plurality of laminations bonded together in a stacked array for circumferentially surrounding the rotor, a given number of the laminations at one end of the stator assembly defining a circumferential mounting flange; and adjustable securing means passing through the flange to mount the stator assembly to the mounting face of the housing about the rotor and for adjusting the position of the stator assembly relative to the rotor.

6. The combination of claim 5 wherein said securing means include a plurality of securing members angularly spaced about the flange.

* * * * *